US010993155B2

(12) United States Patent
Mackenzie (10) Patent No.: US 10,993,155 B2
(45) Date of Patent: Apr. 27, 2021

(54) IMPLEMENTING FUNCTIONAL SPLIT OF PROTOCOL FUNCTIONS IN A CENTRAL BASE STATION UNIT (71) Applicant: British Telecommunications Public Limited Company, London (GB)

(72) Inventor: Richard Thomas Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/574,682

(22) Filed: Sep. 18, 2019

(65) Prior Publication Data
US 2020/0100152 A1 Mar. 26, 2020

(30) Foreign Application Priority Data

Sep. 21, 2018 (GB) ..................... 1815377

(51) Int. Cl.
*H04W 36/00* (2009.01)
*H04W 68/00* (2009.01)
(Continued)

(52) U.S. Cl.
CPC .. *H04W 36/00835* (2018.08); *G06F 9/45558* (2013.01); *H04W 28/16* (2013.01);
(Continued)

(58) Field of Classification Search
CPC .......... H04W 36/00835; H04W 36/08; H04W 28/16; H04W 84/042; H04W 88/08; G06F 9/45558; G06F 2009/45595
(Continued)

(56) References Cited

U.S. PATENT DOCUMENTS 5,384,824 A * 1/1995 Alvesalo ............... H04W 60/04
455/456.2
6,324,405 B1 * 11/2001 Young ................ H04B 7/18508
455/12.1
(Continued)

FOREIGN PATENT DOCUMENTS

CN 104067688 B 9/2014
CN 104303577 B 1/2015
(Continued)

OTHER PUBLICATIONS

3GPP TR 38.801 V14.0.0 "3rd Generation Partnership Project; Technical Specification Group Radio Access Network; Study on New Radio Access Technology: Radio Access Architecture and Interfaces (Release 14)," Mobile Competence Centre, 2017, pp. 1-91.
(Continued)

*Primary Examiner* — Mark G. Pannell
(74) *Attorney, Agent, or Firm* — Patterson Thuente Pedersen, P.A.

(57) ABSTRACT

A method in a cellular telecommunications network having a first central base station unit connecting to each of a plurality of distributed base station units, including identifying a cluster of distributed base station units within the plurality of distributed base station units, wherein each member of the cluster has a neighboring relationship with another member of the cluster that satisfies a threshold; using a first functional split in which a first set of protocol functions are implemented in the first central base station unit and a second set of protocol functions are implemented by each member of the cluster of distributed base station units; identifying a change in the membership of the cluster of distributed base station units; and, in response, causing the first central base station unit and each member of the cluster of distributed base station units to implement a
(Continued)

second functional split in which a third set of protocol functions are implemented in the first central base station unit and a fourth set of protocol functions are implemented by each member of the cluster of distributed base station units.

8 Claims, 8 Drawing Sheets

(51) Int. Cl.
*H04W 4/00* (2018.01)
*G06F 9/455* (2018.01)
*H04W 28/16* (2009.01)
*H04W 36/08* (2009.01)
*H04W 88/08* (2009.01)
*H04W 84/04* (2009.01)

(52) U.S. Cl.
CPC ... *H04W 36/08* (2013.01); *G06F 2009/45595* (2013.01); *H04W 84/042* (2013.01); *H04W 88/08* (2013.01)

(58) Field of Classification Search
USPC ........................................................ 455/436
See application file for complete search history.

(56) References Cited

U.S. PATENT DOCUMENTS

| | | | |
|---|---|---|---|
| 7,400,901 B2 | 7/2008 | Kostic et al. | |
| 8,731,563 B2 | 5/2014 | Yi | |
| 8,897,788 B2 | 11/2014 | Ruuska | |
| 9,042,258 B2 | 5/2015 | Jung et al. | |
| 9,282,528 B2 | 3/2016 | Hashimoto | |
| 9,479,981 B2 | 10/2016 | Dimou et al. | |
| 9,510,206 B2 | 11/2016 | Liu et al. | |
| 9,814,021 B2 | 11/2017 | Himayat et al. | |
| 9,883,431 B2 | 1/2018 | Venkatraman et al. | |
| 10,219,165 B2 | 2/2019 | Futaki | |
| 2013/0021929 A1 | 1/2013 | Kim | |
| 2013/0157676 A1 | 6/2013 | Baek et al. | |
| 2014/0056243 A1* | 2/2014 | Pelletier | H04W 74/04 370/329 |
| 2014/0135031 A1 | 5/2014 | Weiguo | |
| 2014/0220963 A1 | 8/2014 | Jung et al. | |
| 2014/0269322 A1 | 9/2014 | Li et al. | |
| 2016/0174241 A1 | 6/2016 | Ansari et al. | |
| 2016/0219475 A1* | 7/2016 | Kim | H04W 28/08 |
| 2016/0262163 A1 | 9/2016 | Gonzalez Garrido et al. | |
| 2017/0111831 A1 | 4/2017 | Xiao et al. | |
| 2017/0310437 A1 | 10/2017 | Bottari et al. | |
| 2018/0234882 A1 | 8/2018 | Cho et al. | |
| 2018/0255507 A1* | 9/2018 | Nagasaka | H04W 48/16 |
| 2018/0270894 A1* | 9/2018 | Park | H04W 36/0055 |
| 2018/0324780 A1* | 11/2018 | Novlan | H04L 43/0811 |
| 2018/0337846 A1* | 11/2018 | Lee | H04L 45/02 |
| 2019/0230697 A1* | 7/2019 | Yang | H04L 1/1819 |
| 2019/0289478 A1* | 9/2019 | Hosseini | H04W 72/042 |
| 2019/0296882 A1* | 9/2019 | Li | H04W 72/14 |
| 2019/0312713 A1* | 10/2019 | Yang | H04W 72/0493 |

FOREIGN PATENT DOCUMENTS

| | | |
|---|---|---|
| CN | 105103598 B | 11/2015 |
| CN | 107135055 B | 9/2017 |
| EP | 2753143 A1 | 7/2014 |
| EP | 2924924 A1 | 9/2015 |
| EP | 3113532 A1 | 1/2017 |
| EP | 3363259 A1 | 8/2018 |
| ES | 2718906 T3 | 7/2019 |
| GB | 2552844 A | 2/2018 |
| KR | 101533852 B1 | 8/2009 |
| KR | 20150022240 A | 3/2015 |
| RU | 2561859 C2 | 11/2014 |
| WO | WO-2017197063 A1 | 11/2017 |
| WO | WO-2018012873 A1 | 1/2018 |
| WO | WO-2018030819 A1 | 2/2018 |
| WO | WO-2018089803 A1 | 5/2018 |

OTHER PUBLICATIONS

3GPP TS 38.401 V15.2.0, "3rd Generation Partnership Project; Technical Specification Group Radio Access Network; NG-RAN; Architecture description (Release 15)," 650 Route des Lucioles—Sophia Antipolis, Jun. 2018, 39 pages.
Asensio A., et al., "Dynamic Virtual Network Connectivity Services to Support C-RAN Backhauling," Journal of Optical Communications and Networking, vol. 8 (12), Dec. 2016, pp. B93-B103.
Boulos K., et al., "Interference-Aware Clustering in Cloud Radio Access Networks," IEEE International Conference on Cloud Networking, Sep. 2017, 6 pages.
CATT, "Analysis on Fronthaul Split Options," R2-162570, 3GPP TSGRAN WG2 Meeting #93bis, Agenda Item 9.5.1, Mobile Competence Centre, Apr. 2016, pp. 1-5.
Chia-Yu C., et al., "FlexCRAN: A flexible Functional Split Framework over Ethernet fronthaul in Cloud-RAN," IEEE International Conference on Communications, 2017.
Combined Search and Examination Report under Sections 17 and 18(3) for Great Britain Application No. 1815378.3, dated Mar. 4, 2019, 5 pages.
Extended European Search Report for Application No. 18195908.1, dated Nov. 28, 2018, 11 pages.
Extended European Search Report for Application No. 18195909.9, dated Jan. 16, 2019, 14 pages.
Extended European Search Report for Application No. 19195268.8, dated Oct. 1, 2019, 12 pages.
Giannone F., et al., "Impact of RAN Virtualization on Fronthaul Latency Budget: An Experimental Evaluation," IEEE Globecom Workshops, Dec. 2017, 6 pages.
Harutyunyan D., et al., "Flexible Functional Split in 5G Networks," 2017, 9 pages.
NGMN, "NGMN Overview on 5G RAN Functional Decomposition," NGMN Alliance, Version. 1.0, Feb. 2018, 48 pages.
Samsung., "F1AP Function Definition and Categorization," R3-172246, 3GPP TSG-RAN WG3 Meeting Ad Hoc, Mobile Competence Centre, Jun. 2017, 4 pages.
Search Report under Section 17 for Great Britain Application No. 1815377.5, dated Mar. 12, 2019, 4 pages.
Valastro G.C., et al., "A SDN/NFV Based C-RAN Architecture for 5G Mobile Networks," IEEE, International Conference on Selected Topics in Mobile and Wireless Networking, XP033383120, Jun. 2018, 8 pages.
3GPP TR 38.801 V2.0.0 "3rd Generation Partnership Project; Technical Specification Group Radio Access Network; Study on New Radio Access Technology: Radio Access Architecture and Interfaces (Release 14)," 2017, pp. 1-90.
Extended European Search Report for EP Application No. 18190557.1, dated Mar. 1, 2019, 10 pages.
Notification of Transmittal of the International Search Report and Written Opinion of the International Searching Authority for Application No. PCT/EP2019/067971, dated Aug. 20, 2019, 14 pages.
Notification of Transmittal of the International Search Report and Written Opinion of the International Searching Authority for Application No. PCT/EP2019/073331, dated Sep. 25, 2019, 18 pages.
Search Report for GB Application No. 1813777.8, dated Feb. 26, 2019, 5 pages.
Written Opinion for Application No. PCT/EP2019/073331, dated Sep. 11, 2020, 9 pages.

* cited by examiner

Figure 3a
Time, $t_1$

Figure 3b
Time, $t_2$

Figure 3c
Time, $t_3$

Figure 3d
Time, $t_4$

Figure 3e
Time, $t_5$

Figure 4

IMPLEMENTING FUNCTIONAL SPLIT OF PROTOCOL FUNCTIONS IN A CENTRAL BASE STATION UNIT

RELATED APPLICATION

The present application claims priority to United Kingdom Application No. 1815377.5 filed Sep. 21, 2018, which is hereby incorporated herein in its entirety by reference.

TECHNICAL FIELD

The present disclosure relates to a cellular telecommunications network. In particular, it relates to a cellular telecommunications network implementing a centralized radio access network.

BACKGROUND

Modern cellular networks support Centralized Radio Access Network (C-RAN) architectures in which a base station may be split into a central unit and a distributed unit. The central unit interconnects a core cellular network with a plurality of distributed units, and the plurality of distributed units each communicate with a plurality of UEs. The various protocol layers of the cellular protocol in use are split between the central and distributed units such that the distributed units implement the lowermost layer (e.g. the radio frequency layer) and optionally one or more higher layers, and all other higher layers are implemented in the central unit. As more protocol layers are implemented in the central unit, then the central unit may improve coordination across multiple distributed units and thereby improve Quality of Service. However, such protocol splits require higher capacity links between the central unit and distributed units, so a balance must be struck when determining which protocol split to use.

SUMMARY

According to a first aspect of the disclosure, there is provided a method in a cellular telecommunications network, the cellular telecommunications network having a first central base station unit connecting to each of a plurality of distributed base station units, the method comprising identifying a cluster of distributed base station units within the plurality of distributed base station units, wherein each member of the cluster has a neighboring relationship with another member of the cluster that satisfies a threshold; using a first functional split in which a first set of protocol functions are implemented in the first central base station unit and a second set of protocol functions are implemented by each member of the cluster of distributed base station units; identifying a change in the membership of the cluster of distributed base station units; and, in response, causing the first central base station unit and each member of the cluster of distributed base station units to implement a second functional split in which a third set of protocol functions are implemented in the first central base station unit and a fourth set of protocol functions are implemented by each member of the cluster of distributed base station units.

The change in the membership of the cluster of distributed base station units may an addition of a new distributed base station unit to the cluster, and the method may further comprise, before determining to use the second functional split, initiating a handover of the new distributed base station unit from a second central base station unit to the first central base station unit.

Before performing the handover of the new distributed base station unit, the method may further comprise causing the second central base station unit and new distributed base station unit to use the first functional split in which the first set of protocol functions are further implemented in the second central base station unit and the second set of protocol functions are further implemented in the new distributed base station unit.

The method may further comprise receiving data relating to the membership of the cluster of distributed base station units; and determining, based on the data, that the first central base station unit and each member of the cluster of distributed base station units should use the second functional split.

The first and second central base station units may be implemented on separate virtual machines on a network node.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a network node for a cellular telecommunications network, the network node comprising a transceiver, memory and processor adapted to cooperate to implement the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
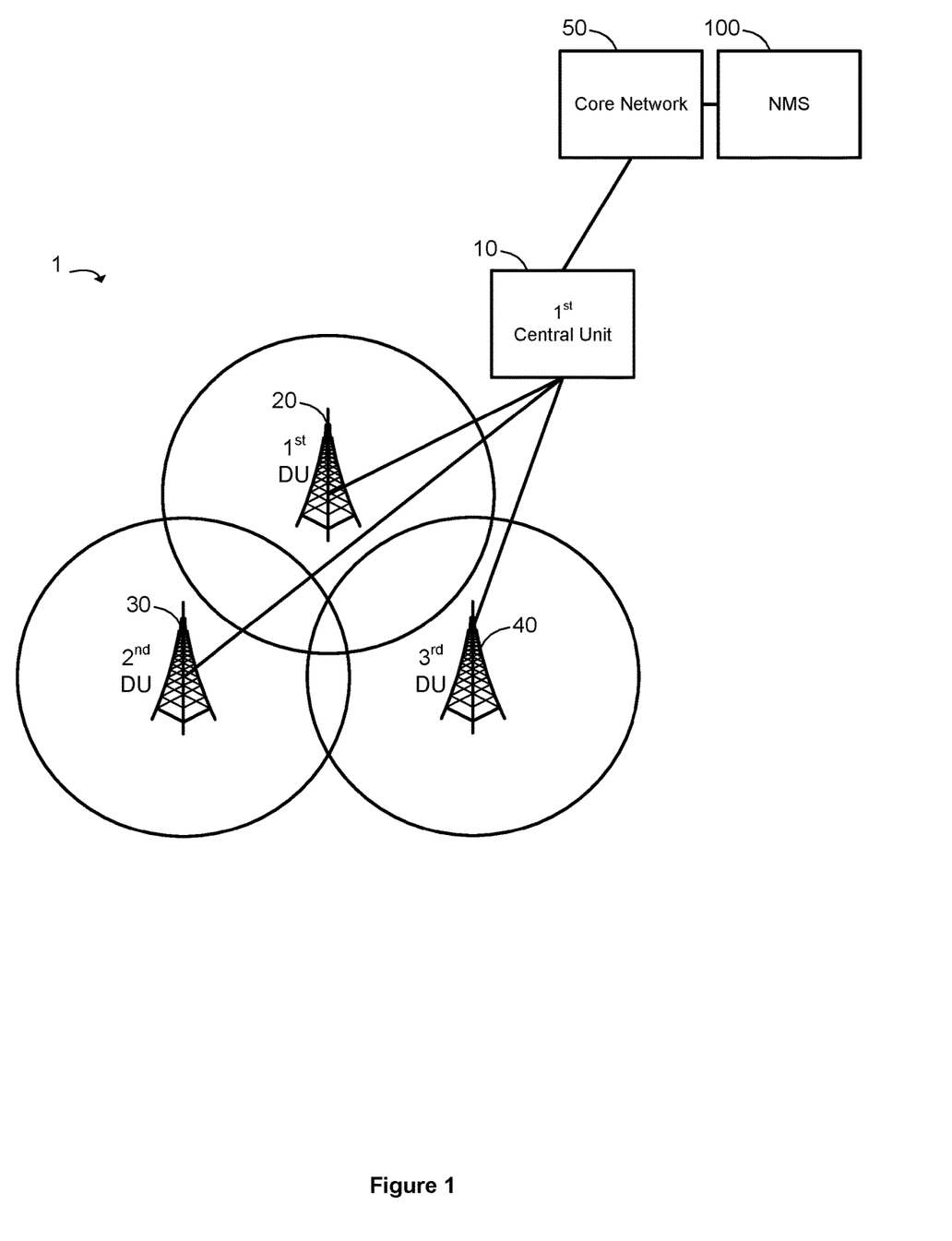
FIG. 1 is a schematic diagram of a cellular telecommunications network of an embodiment of the present disclosure.

A first embodiment of a cellular telecommunications network 1 will now be described with reference to FIGS. 1 and 2. The cellular telecommunications network 1 is based on a Centralized Radio Access Network (C-RAN) architecture having a first central unit 10, and first, second and third distributed units ("$1^{st}/2^{nd}/3^{rd}$ DU" in the FIGS. 20, 30, 40. The central unit 10 interconnects each of the first, second and third distributed units 20, 30, 40 to a cellular core network 50, which includes a Network Management System (NMS) 100. The coverage areas of each of the first, second and third distributed units 20, 30, 40 are shown by their respective enveloping circles.

Figure 2:
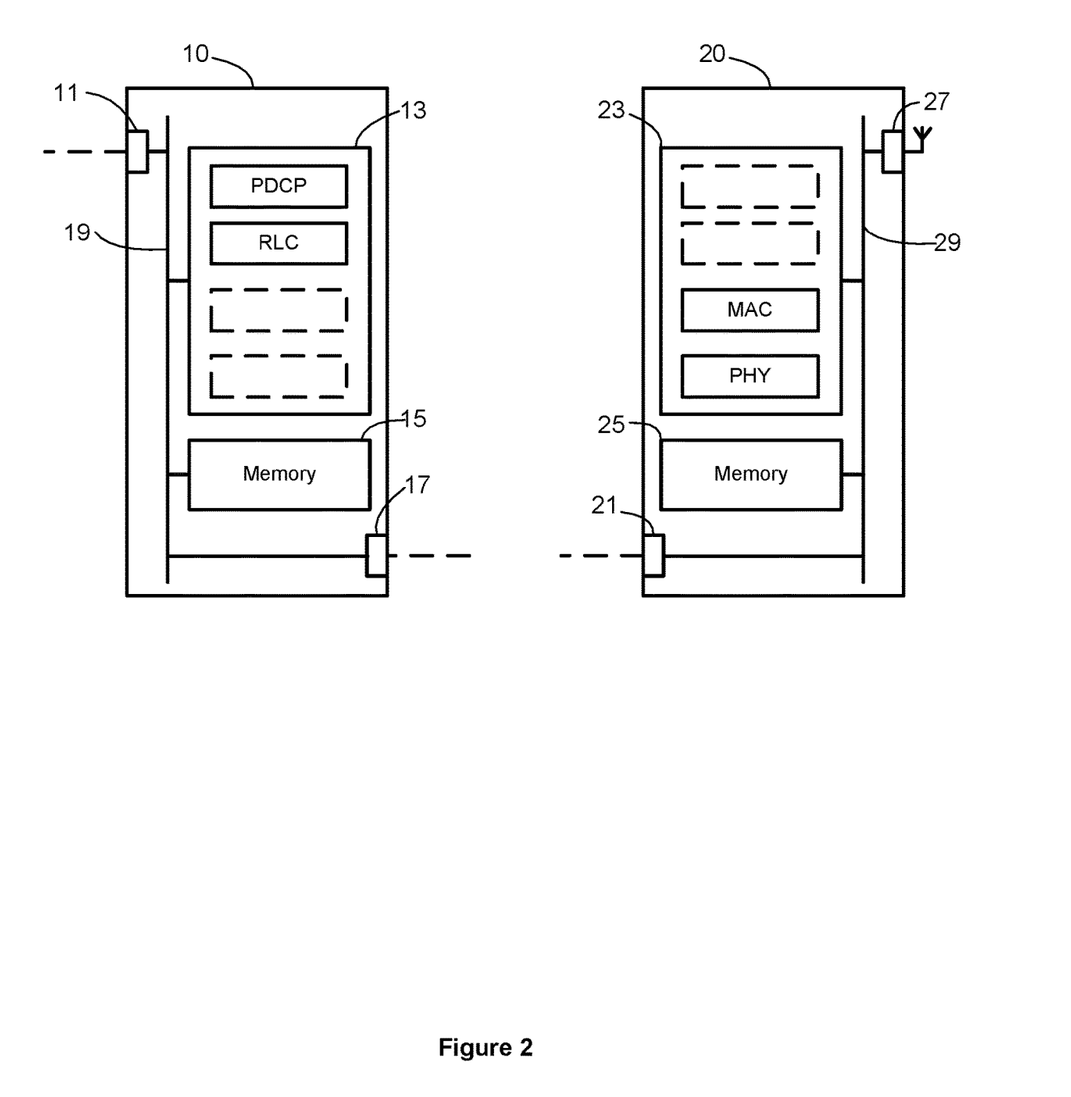
FIG. 2 is a schematic diagram of a central base station unit and distributed base station unit of the cellular network of FIG. 1.

FIG. 2 illustrates the central unit 10 and the first distributed unit 20 in more detail. As shown, the central unit 10 has a first transceiver 11, a processor 13, memory 15, and a second transceiver 17, all connected via bus 19. The first transceiver 11 is a wired communications interface such that the central unit 10 may communicate with one or more cellular core networking nodes (such as the NMS 100). In this embodiment, the second transceiver 17 is a wired communications interface such that the central unit 10 may communicate with each of the first, second, and third distributed units 20, 30, 40. The transceivers, processor and memory are configured to cooperate to define a Software Defined Networking (SDN) operating environment, allowing the central unit 10 to reconfigure on demand.

Furthermore, the first distributed unit 20 also includes a first transceiver 21 for wired communication with the central unit 10, a processor 23, memory 25, a second transceiver 27 for wireless communication with one or more User Equipment (UE), all connected via bus 29. Similarly, the transceivers, processor and memory are configured to cooperate to define a Software Defined Networking (SDN) operating environment, allowing the first distributed unit 20 to reconfigure on demand.

FIG. 2 also illustrates the processors of the central unit 10 and first distributed unit 20 implementing different functions of their operating protocol (which, in this embodiment, is the Long Term Evolution (LTE) protocol). The various functions of the LTE protocol are split between the respective processors 13, 23 of the central unit 10 and first distributed unit 20 such that the first distributed unit 20 implements the physical (PHY) function and Medium Access Control (MAC) function, and the central unit 10 implements the Radio Link Control (RLC) function, and Packet Data Convergence Control (PDCP) function. In doing so, the central unit 10 may coordinate transmissions of several distributed units to improve Quality of Service (QoS) in the cellular network 1.

The processors of the central unit 10 and first distributed unit 20 are able to reconfigure (as they operate SDN environments) to implement different functional splits, such as:
  A) First Distributed Unit 20: Lower PHY, Central Unit 10, Higher PHY, MAC, RLC, PDCP;
  B) First Distributed Unit 20: PHY, Central Unit 10: MAC, RLC, PDCP;
  C) First Distributed Unit 20: PHY, MAC, Central Unit 10: RLC, PDCP (as shown);
  D) First Distributed Unit 20: PHY, MAC, RLC Central Unit 10: PDCP;
  E) First Distributed Unit 20: PHY, MAC, RLC, PDCP Central Unit 10: N/A;

Furthermore, the central unit 10 and first distributed unit 20 may implement further functions (in which case further functional splits would be possible).

In this embodiment, the second and third distributed units 30, 40 are similar to the first distributed unit 20.

Figure 3A:
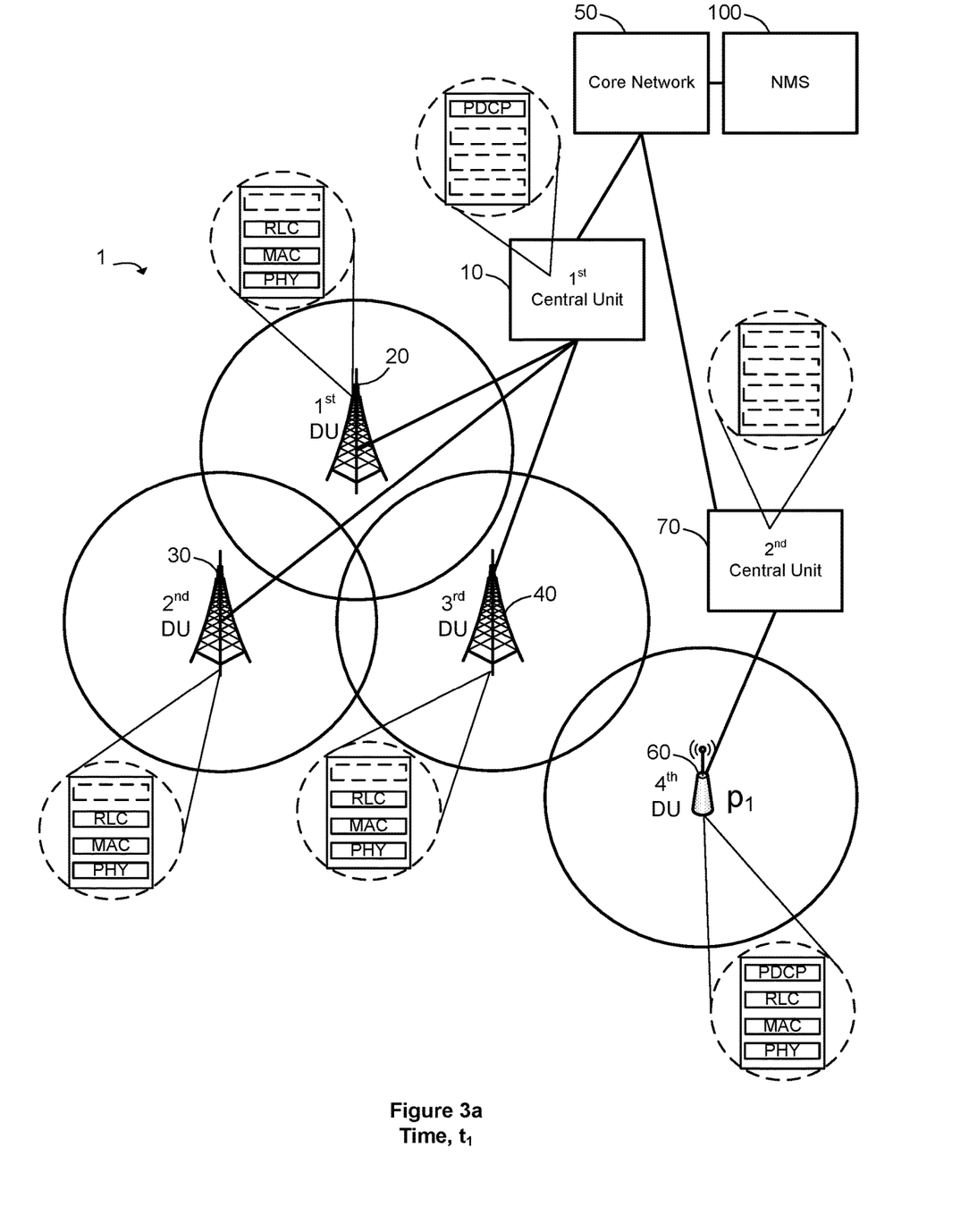
FIG. 3a is a schematic diagram of the cellular telecommunications network of FIG. 1 at time $t_1$.
Figure 3B:
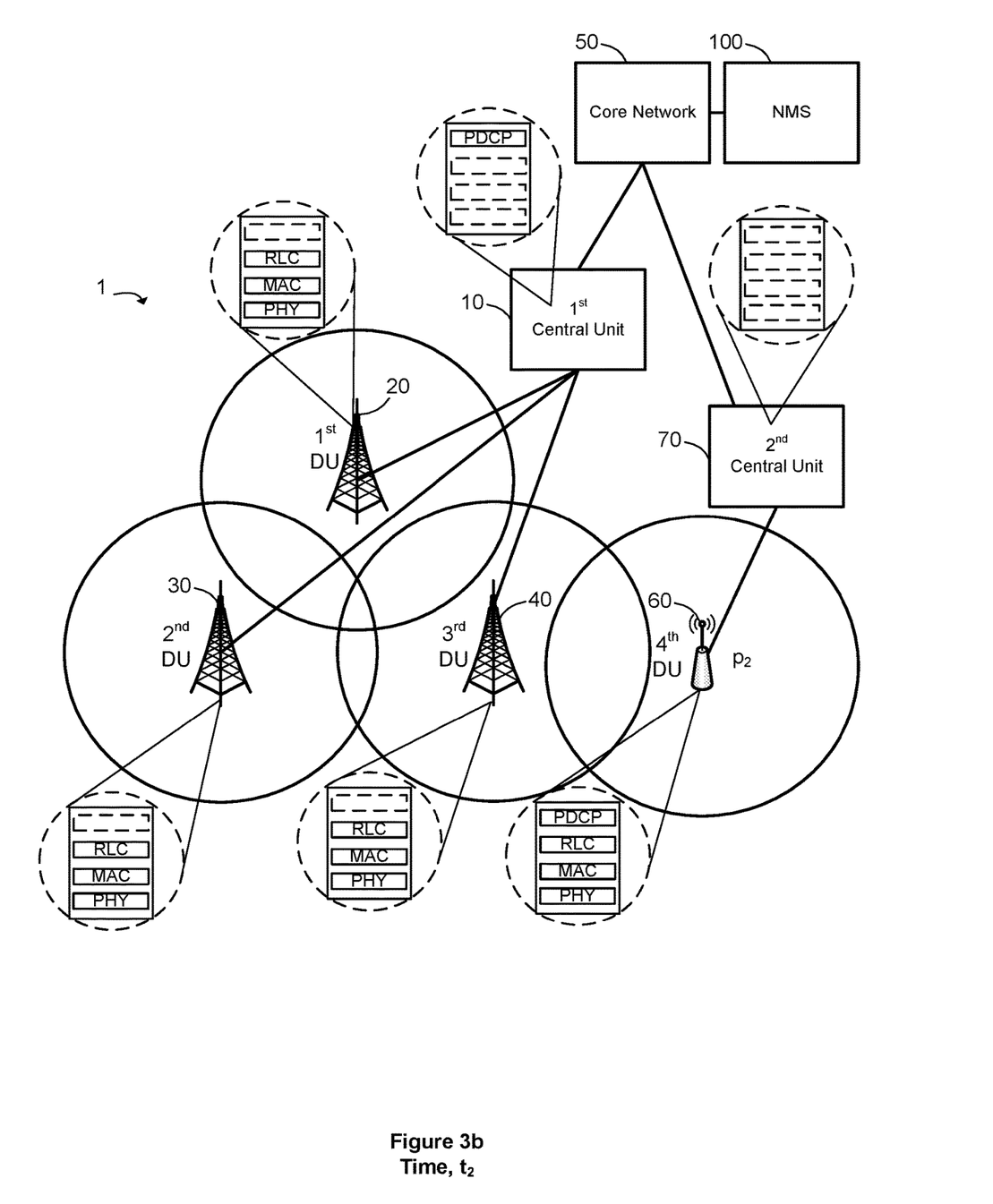
FIG. 3b is a schematic diagram of the cellular telecommunications network of FIG. 1 at time $t_2$.
Figure 3C:
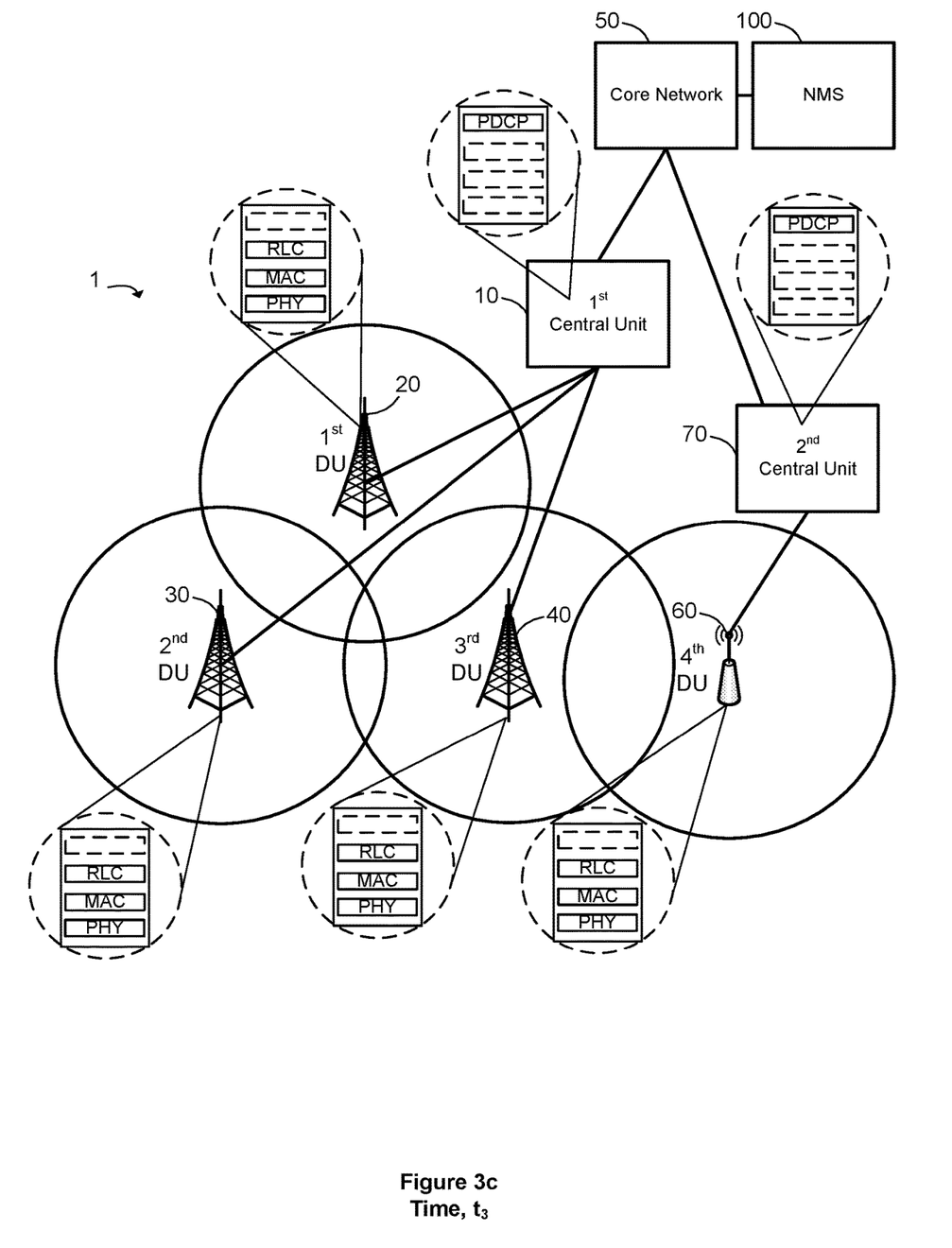
FIG. 3c is a schematic diagram of the cellular telecommunications network of FIG. 1 at time $t_3$.
Figure 3D:
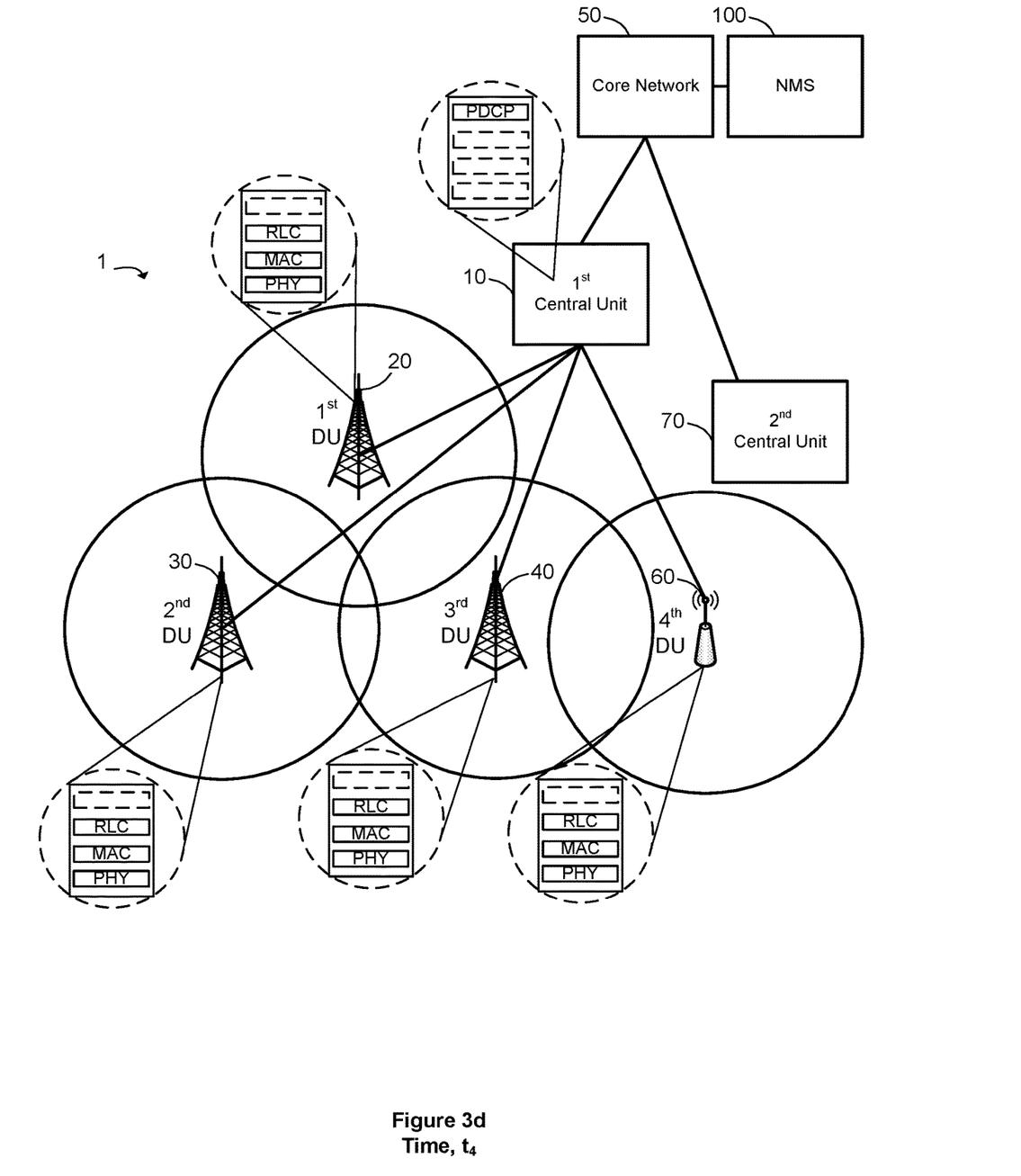
FIG. 3d is a schematic diagram of the cellular telecommunications network of FIG. 1 at time $t_4$.
Figure 3E:
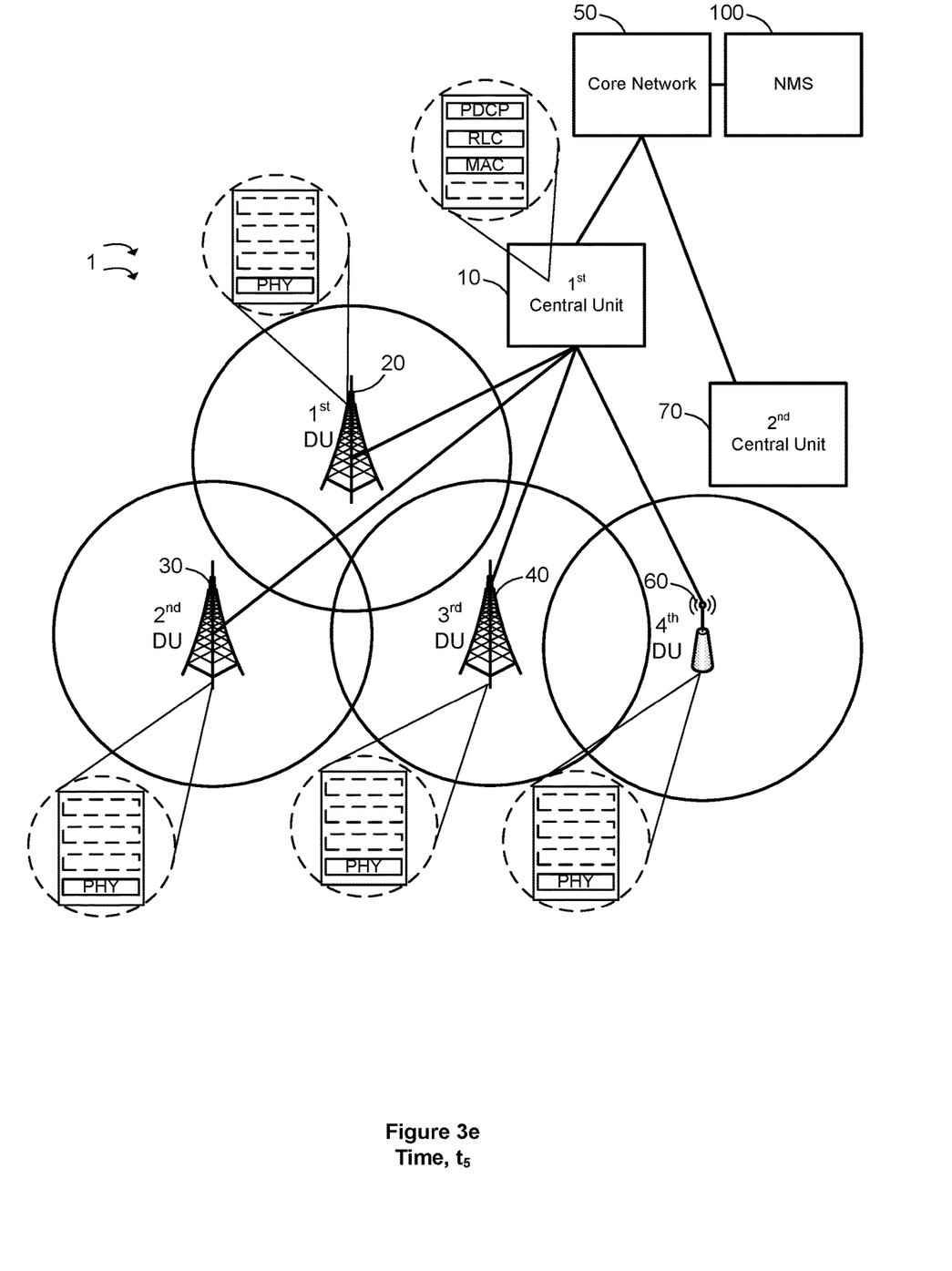
FIG. 3e is a schematic diagram of the cellular telecommunications network of FIG. 1 at time $t_5$.
Figure 4:
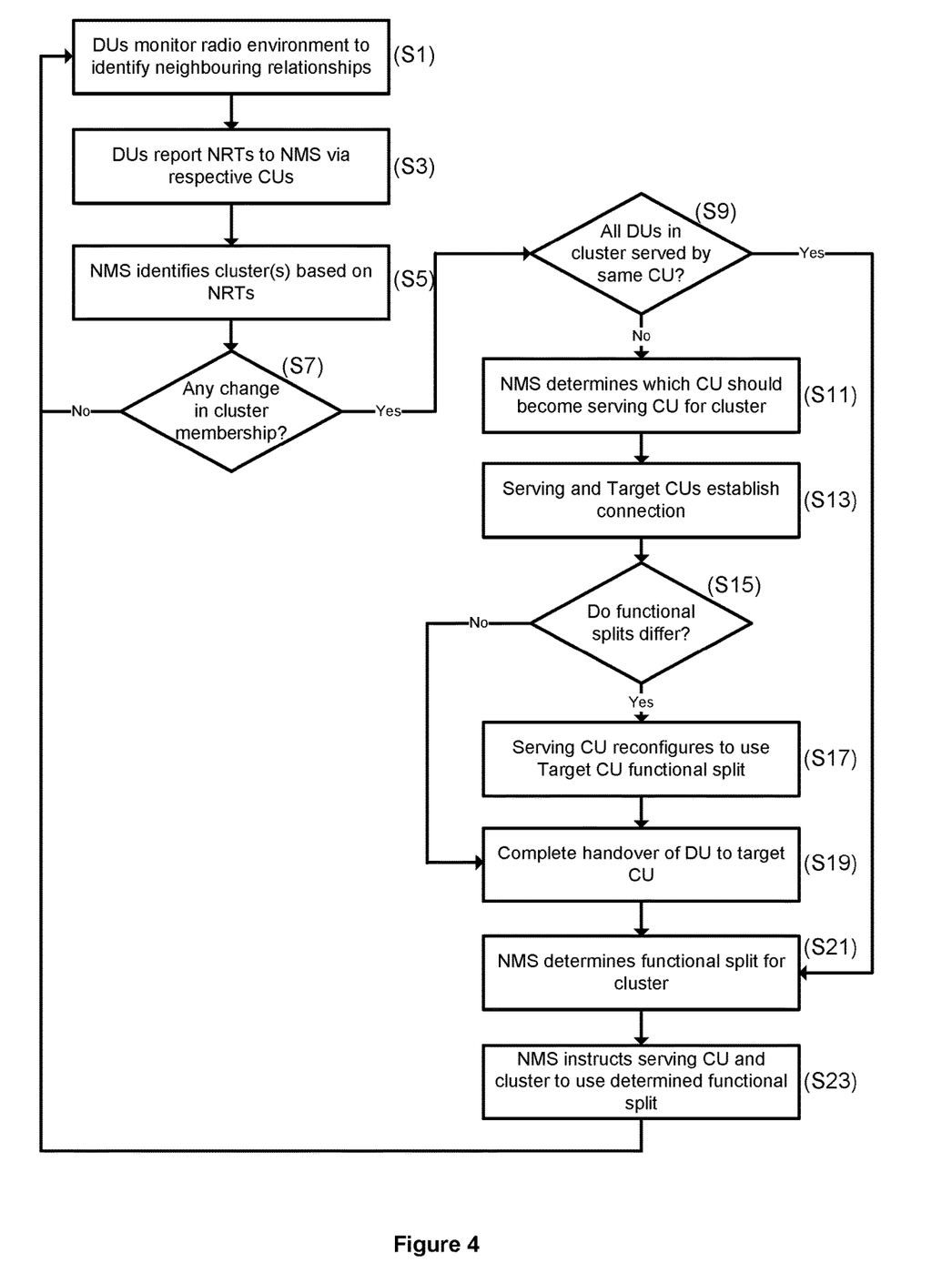
FIG. 4 is a flow diagram illustrating a method of an embodiment of the present disclosure.

A first embodiment of a method of the present disclosure will now be described with reference to FIGS. 3a to 3e and the flow diagram of FIG. 4. FIG. 3a illustrates the cellular telecommunications network 1 at time $t_1$, in which the central unit 10 interconnects the first, second and third distributed units 20, 30, 40 to the core network 50 and implement functional split D (noted above) such that the first central unit 10 implements the PDCP function and the first, second and third distributed units 20, 30, 40 implement the PHY, MAC and RLC functions.

FIG. 3a further illustrates a fourth distributed unit 60. The fourth distributed unit 60 is similar to the first, second and third distributed units 20, 30, 40, but is mobile by virtue of being mounted on a train (not shown). Furthermore, the fourth distributed unit 60 is connected to a second central unit 70, which is similar to the first central unit 10 and has onward connections to the cellular core network 50 (and thus an onward connection to the NMS 100). The second central unit 70 and fourth distributed unit 60 implement functional split E (noted above), such that the fourth distributed unit 60 implements all functions of the protocol stack. In FIG. 3a, the fourth distributed unit 60 is located at position $p_1$.

In this starting scenario as illustrated in FIG. 3a, the NMS 100 stores a cluster database identifying each cluster of distributed units and its membership. The definition of a cluster will become clear upon review of the following embodiment, but it is noted that in this starting scenario the first, second and third distributed units 20, 30, 40 are all members of a first cluster but the fourth distributed unit 60 is not part of the first (or any other cluster). The fourth distributed unit 60 is therefore a "lone" distributed unit.

In S1 of this embodiment, each distributed unit 20, 30, 40, 60 monitors (directly or indirectly) its radio environment to identify one or more neighboring relationships with other distributed units in the cellular telecommunications network 1. In this embodiment, this is triggered periodically upon a) receipt of a measurement report from UEs connected to each distributed unit 20, 30, 40, 60 and/or b) a network listen function by each distributed unit 20, 30, 40, 60. In response, each distributed unit 20, 30, 40, 60 may cooperate with its respective central unit 10, 70 to process the data (that is, using the processing functions that are implemented in the central unit). Each distributed unit 20, 30, 40, 60 then updates a Neighbor Relations Table (NRT), which identifies each neighboring distributed unit and further identifies the strength of a signal (e.g. the Reference Signal Received Power, RSRP) from each neighboring distributed unit. Following this, the NRTs for each distributed unit are:

TABLE 1

NRT for the First Distributed Unit 20 at time $t_1$

| Base Station Identifier (eCGI) | RSRP (dBm) |
| --- | --- |
| Second Distributed Unit | >X |
| Third Distributed Unit | >X |

TABLE 2

NRT for the Second Distributed Unit 30 at time $t_1$

| Base Station Identifier (eCGI) | RSRP (dBm) |
| --- | --- |
| First Distributed Unit | >X |
| Third Distributed Unit | >X |

TABLE 3

NRT for the Third Distributed Unit 40 at time $t_1$

| Base Station Identifier (eCGI) | RSRP (dBm) |
|---|---|
| First Distributed Unit | >X |
| Second Distributed Unit | >X |
| Fourth Distributed Unit | <X |

TABLE 4

NRT for the Fourth Distributed Unit 60 at time $t_1$

| Base Station Identifier (eCGI) | RSRP (dBm) |
|---|---|
| Second Distributed Unit | <X |

Although the value of the threshold X may vary in any particular cellular network, in this embodiment the value is −100 dBm. This threshold may also be in the range of −120 dBm to −90 dBm.

In S3, each distributed unit 20, 30, 40, 60 reports these NRTs to the NMS 100 via their respective central units 10, 70. In doing so, the NMS 100 records the central unit associated with each distributed unit reporting its NRT. In S5, the NMS 100 identifies one or more clusters of distributed units based on this data. In this embodiment, a cluster is a subset of distributed units wherein each member of the cluster receives a reference signal from at least one other member of the cluster above strength X dBm. Based on the above data, the first, second and third distributed units 20, 30, 40 are all in a cluster (as they all measure an RSRP value for another member of the cluster above X dBm), but the fourth distributed unit 60 is not in a cluster (as it does not measure an RSRP value for a member of the cluster above X dBm).

In S7, the NMS 100 determines if there has been a change in membership of any cluster of distributed units based on a comparison of the data in the cluster database and the identified cluster in S5. As noted above, the initial scenario for the cellular network 1 is that there is a first cluster comprising the first, second and third distributed units 20, 30, 40. Following S5, the latest NRTs indicate that the first cluster still comprises the first, second and third distributed units 20, 30, 40. There is therefore no change in membership of the first cluster. Accordingly, this first iteration of the method ends.

The method then loops back to S1 for a second iteration. The starting point for the second iteration is at time $t_2$ as shown in FIG. 3b, in which the fourth distributed unit 60 moves to a new position ($p_2$) having a greater overlapping coverage area with the third distributed unit 40. In the second iteration of S1, the first, second, third and fourth distributed units 20, 30, 40, 60 update their respective NRTs based on new measurements, thus:

TABLE 5

NRT for the First Distributed Unit 20 at time $t_2$

| Base Station Identifier (eCGI) | RSRP (dBm) |
|---|---|
| Second Distributed Unit | >X |
| Third Distributed Unit | >X |

TABLE 6

NRT for the Second Distributed Unit 30 at time $t_2$

| Base Station Identifier (eCGI) | RSRP (dBm) |
|---|---|
| First Distributed Unit | >X |
| Third Distributed Unit | >X |

TABLE 7

NRT for the Third Distributed Unit 40 at time $t_2$

| Base Station Identifier (eCGI) | RSRP (dBm) |
|---|---|
| First Distributed Unit | >X |
| Second Distributed Unit | >X |
| Fourth Distributed Unit | >X |

TABLE 8

NRT for the Fourth Distributed Unit 60 at time $t_2$

| Base Station Identifier (eCGI) | RSRP (dBm) |
|---|---|
| Second Distributed Unit | >X |

The fourth distributed unit 60 has therefore moved into a position in which the RSRP of its signals as measured by the third distributed unit 40 has risen above X dBm and the RSRP of the third distributed unit's signal as measured by the fourth distributed unit 60 has also risen above X dBm.

In the second iterations of S3 and S5, each distributed unit 20, 30, 40, 60 reports its NRT to the NMS 100, and the NMS 100 identifies one or more clusters of distributed units based on this data. As the third distributed unit 40 now has a neighboring relationship with the fourth distributed unit 60 above a first threshold (i.e. RSRP>X dBm), then the NMS 100 determines that the first cluster now comprises the first, second, third and fourth distributed units 20, 30, 40, 60. For the sake of completeness, it is not necessary for the NRTs for the third and fourth distributed unit to both indicate that the neighboring relationship has risen above a threshold. That is, the NMS 100 may determine that the cluster now also includes the fourth distributed unit 60 if one of the NRTs of the third or fourth distributed unit 40, 60 indicate that the neighboring relationship has risen above the threshold (e.g. if the NRT was updated based on a measurement report from a UE connected to one of the third or fourth distributed unit).

In the second iteration of S7, the NMS 100 positively determines that there has been a change in membership of the first cluster. The NMS 100 responds to this determination by reconfiguring the cellular network 1 such that all distributed units are served by the same central unit and have the same functional split. In this embodiment, this is achieved by implementing the following.

In S9, the NMS 100 determines whether all distributed units in the first cluster are served by the same central unit. If so, then the process proceeds to S21. However, in this embodiment, this determination is negative as the first, second and third distributed units 20, 30, 40 are served by the first central unit 10 but the fourth distributed unit 60 is served by the second central unit 70. In response, in S11, the NMS 100 determines which central unit should become the common central unit to serve all distributed units of the cluster. This determination may be based on the number of handovers that must be performed, the quality of the connection between each central unit and each distributed unit, and/or the spare processing capacity of the central units. In this embodiment, the NMS 100 determines that the fourth distributed unit 60 should handover to the first central unit 10 and sends an instruction message to the second central unit 70.

In S13, the second central unit 70 establishes a connection (e.g. an X2 connection) with the first central unit 10. Once established, the second central unit 70 sends a request message to the first central unit 10 to discover the current functional split implemented by the first central unit 10. The first central unit 10 responds with information on its functional split (e.g. using an identifier). In S15, the second central unit 70 determines whether the functional split in use between the second central unit 70 and fourth distributed unit 60 differs from the functional split implemented by the first central unit 10. If not, then the process proceeds to S19. However, in this embodiment, this determination is positive and the process proceeds to S17 in which the second central unit 70 and fourth distributed unit 60 reconfigure to use the same functional split as used by the first central unit 10. Following this reconfiguration, the cellular network 1 is as shown in FIG. 3c, in which the functional split implemented between the first central unit 10 and the first, second and third distributed units 20, 30, 40 match the functional split implemented between the second central unit 70 and the fourth distributed unit 60.

In S19, the second central unit 70 and first central unit 10 cooperate to complete a handover of the fourth distributed unit 60 to the first central unit 10. Following the handover, the cellular network 1 is as shown in FIG. 3d, in which the first central unit 10 serves the first, second, third and fourth distributed units 20, 30, 40, 60 such that it now serves the updated membership of the first cluster. Upon completion of the handover, the first central unit 10 sends a message to the NMS 100 indicating that the handover is complete.

In S21, the NMS 100 determines a functional split between each cluster of distributed units and their respective central unit and between each lone distributed unit (i.e. not being a member of a cluster) and its respective central unit (if applicable). In this embodiment, the NMS 100 compares the signal strength data (from the NRTs) to a respective threshold for each functional split, and determines that functional split B (as noted above) is suitable between the first central unit 10 and the first cluster. In S23, the NMS 100 sends an instruction message to the first central unit 10 to implement functional split B with the first cluster. Following this reconfiguration, the cellular network 1 is as shown in FIG. 3e.

The above embodiment provides the benefit of introducing a trigger for reconfiguring a functional split between a central unit and a cluster of distributed units based upon a positive identification that there is change of membership in the cluster. The cluster may be defined as a subset of distributed units having a neighboring relationship above a particular threshold, such that the trigger for reconfiguring the functional split is effectively based upon a distributed unit increasing or decreasing its neighboring relationship with another distributed unit passed this threshold. This is an interesting point in time to evaluate the functional split as any new member or departing member of the cluster may significantly change the potential interference across the cluster.

The neighboring relationship threshold may be configured by the operator to reflect when signals from two neighboring distributed units are significantly interfering that coordination by a central unit is appropriate. This may be inferred from, for example, RSRP measurements by the distributed unit or its UEs. Furthermore, the determination of what functional split to use need not be based on a comparison of the RSRP to one or more thresholds (e.g. a respective threshold for each functional split). That is, the functional split may be chosen based on the number of distributed units in a cluster.

Furthermore, the skilled person will understand that it is not essential for the method to be carried out in the NMS. Instead, another entity (including a central unit) may perform the method.

In the above example, the fourth distributed unit was mobile such that it became part of the cluster when it moved to position $p_2$. However, this is non-essential and the skilled person will understand that another distributed unit may always be positioned in a suitable geographical location to be a member of the cluster but only satisfy the neighboring relationship threshold upon (for example) reconfiguration, being re-enabled after energy saving, or becoming more heavily loaded.

Furthermore, it is non-essential that the fourth distributed unit is connected to a second central unit. That is, the fourth distributed unit may be connected to the first central unit but not satisfy the neighboring relationship threshold to become part of the first cluster. In this scenario, the first central unit may implement different virtual machines in order to serve the first cluster using a first functional split and to serve the fourth distributed unit using a second functional split.

In the above embodiments, the fourth distributed unit was handed over to the first central unit. This is beneficial as it is easier to implement a common functional split among all distributed units. However, it is non-essential as the functional split could be coordinated across separate central units (especially if the two central units are implemented by separate virtual machines on the same platform).

In the above embodiment, the fourth distributed unit was a lone distributed unit before it joined the first cluster. However, this is non-essential. The fourth distributed unit may be part of a second cluster. In this scenario, the fourth distributed unit (and one or more other distributed units of the second cluster) may leave the second cluster and join the first cluster.

In the above embodiment, the central units and their respective distributed units implement different proportions of the overall set of functions of the protocol in use (LTE in the above example, although any other cellular/wireless communications protocol may be used). The skilled person will understand that whole layers of a protocol may be moved between the central unit and distributed unit, or just a part (i.e. function) thereof. Thus, the central unit may implement a first set of protocol functions, and a distribution unit may implement a second set of protocol functions. The first set of functions may be the lowermost function up and including a particular function, and the second set of functions may be all functions above that particular function. In other words, the first and second sets of functions may be distinct.

Furthermore, the distributed units may implement the RF functions of the protocol only, and all other functions may be implemented in the central unit. Still furthermore, embodiments may be realized across a cascaded RAN in which the overall set of functions are distributed across (for example) a remote radio head, a distributed unit and a central unit.

The skilled person will understand that any combination of features is possible within the scope of the invention, as claimed.

The invention claimed is:

1. A method in a cellular telecommunications network, the cellular telecommunications network having a first central base station unit connecting to each of a plurality of distributed base station units, the method comprising:
   identifying a cluster of distributed base station units within the plurality of distributed base station units, wherein each member of the cluster has a neighboring relationship with another member of the cluster that satisfies a threshold;
   using a first functional split in which a first set of protocol functions are implemented in the first central base station unit and a second set of protocol functions are implemented by each member of the cluster of distributed base station units;
   identifying a change in the membership of the cluster of distributed base station units; and, in response,
   causing the first central base station unit and each member of the cluster of distributed base station units to implement a second functional split in which a third set of protocol functions are implemented in the first central base station unit and a fourth set of protocol functions are implemented by each member of the cluster of distributed base station units.

2. The method as claimed in claim 1, wherein the change in the membership of the cluster of distributed base station units is an addition of a new distributed base station unit to the cluster, and the method further comprises, before determining to use the second functional split, initiating a handover of the new distributed base station unit from a second central base station unit to the first central base station unit.

3. The method as claimed in claim 2, wherein, before performing the handover of the new distributed base station unit, the method further comprises causing the second central base station unit and the new distributed base station unit to use the first functional split in which the first set of protocol functions are further implemented in the second central base station unit and the second set of protocol functions are further implemented in the new distributed base station unit.

4. The method as claimed in claim 2, wherein the first central base station unit and the second central base station unit are implemented on separate virtual machines on a network node.

5. The method as claimed in claim 1, further comprising:
   receiving data relating to the membership of the cluster of distributed base station units; and
   determining, based on the received data, that the first central base station unit and each member of the cluster of distributed base station units should use the second functional split.

6. A non-transitory computer-readable storage medium storing a computer program product comprising instructions which, when the computer program is executed by a computer, cause the computer to carry out the method of claim 1.

7. A system comprising:
   at least one processor and memory configured to, in a cellular telecommunications network having a first central base station unit connecting to each of a plurality of distributed base station units:
   identify a cluster of distributed base station units within the plurality of distributed base station units, wherein each member of the cluster has a neighboring relationship with another member of the cluster that satisfies a threshold;
   use a first functional split in which a first set of protocol functions are implemented in the first central base station unit and a second set of protocol functions are implemented by each member of the cluster of distributed base station units;
   identify a change in the membership of the cluster of distributed base station units; and, in response,
   cause the first central base station unit and each member of the cluster of distributed base station units to implement a second functional split in which a third set of protocol functions are implemented in the first central base station unit and a fourth set of protocol functions are implemented by each member of the cluster of distributed base station units.

8. A network node for a cellular telecommunications network, the network node comprising:
   a transceiver, memory and at least one processor adapted to cooperate, in a cellular telecommunications network having a first central base station unit connecting to each of a plurality of distributed base station units, to:
   identify a cluster of distributed base station units within the plurality of distributed base station units, wherein each member of the cluster has a neighboring relationship with another member of the cluster that satisfies a threshold;
   use a first functional split in which a first set of protocol functions are implemented in the first central base station unit and a second set of protocol functions are implemented by each member of the cluster of distributed base station units;
   identify a change in the membership of the cluster of distributed base station units; and, in response,
   cause the first central base station unit and each member of the cluster of distributed base station units to implement a second functional split in which a third set of protocol functions are implemented in the first central base station unit and a fourth set of protocol functions are implemented by each member of the cluster of distributed base station units.

* * * * *